United States Patent

[11] 3,581,638

| [72] | Inventors | William T. Colville<br>Williamsport;<br>George W. Parsons, Hughesville, Pa. |
|---|---|---|
| [21] | Appl. No. | 764,878 |
| [22] | Filed | Oct. 3, 1968 |
| [45] | Patented | June 1, 1971 |
| [73] | Assignee | Eastman Kodak Company<br>Rochester, N.Y. |

[54] PHOTOGRAPHIC APPARATUS
7 Claims, 5 Drawing Figs.

[52] U.S. Cl. .................................................. 95/11.5, 95/31, 431/92
[51] Int. Cl. ..................................................... G03b 15/04
[50] Field of Search .......................................... 95/11.5; 431/92, 93, Inquired

[56] References Cited
UNITED STATES PATENTS

| 590,204 | 9/1897 | Blackmore .................... | 95/11.5 |
| 1,814,299 | 7/1931 | Drucker ........................ | 431/92 |
| 3,353,467 | 11/1967 | Ermisse et al. ................. | 95/11.5 |
| 3,439,992 | 4/1969 | Shaffer et al. .................. | 431/93 |

Primary Examiner—John M. Horan
Assistant Examiner—M. L. Gellner
Attorneys—Normal J. O'Malley and Joseph C. Ryan ABSTRACT: A camera for receiving a photoflash lamp ignitable by striking, for example, a percussive type of photoflash lamp, is fired by a striking device powered by a torsional spring. Preferably, the torsional spring has a longitudinal axis and two laterally disposed ends with one such end of the torsional spring being movable to cock or energize the spring and the other end being movable to fire the flash lamp.

Patented June 1, 1971

GEORGE W. PARSONS
WILLIAM T. COLVILLE
INVENTORS

BY Joseph C. Ryan
ATTORNEY

Patented June 1, 1971
3,581,638
2 Sheets-Sheet 2
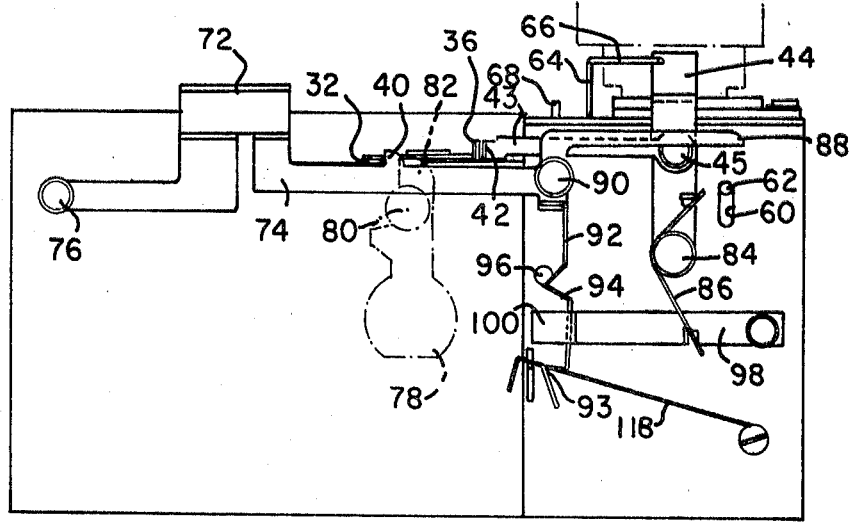
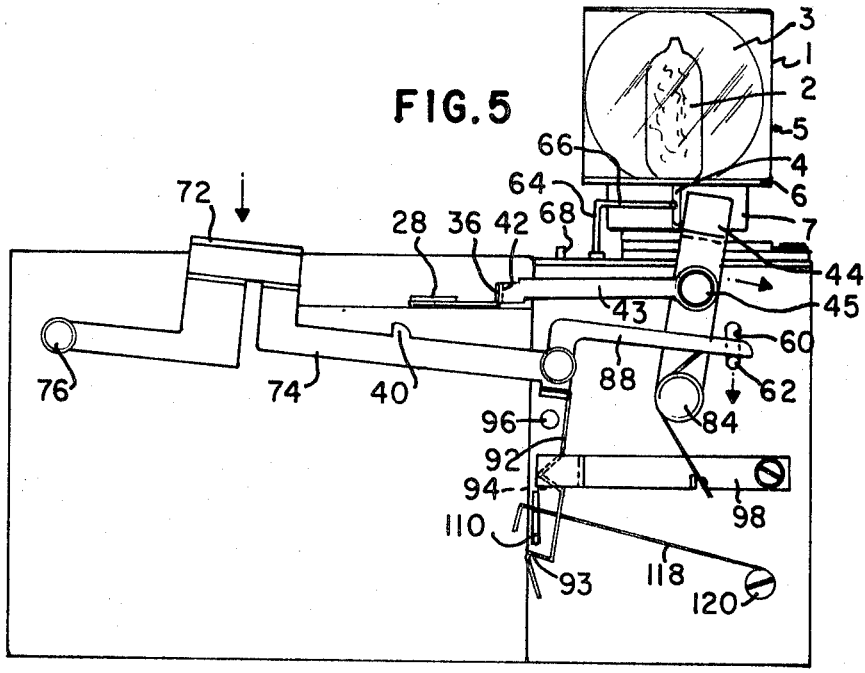
GEORGE W. PARSONS
WILLIAM T. COLVILLE
INVENTORS
BY Joseph C. Ryan
ATTORNEY

PHOTOGRAPHIC APPARATUS

This invention relates to photographic apparatus and more particularly to cameras having flash mechanisms, including devices for firing photoflash lamps.

For many years most cameras sold commercially have been provided with a source of electrical energy, such as dry cell batteries, which provide the means for energizing and firing flashlamps of the electric primer type. In some cases the batteries are located in a compartment provided therefor within the main body of the camera whereas in other cases the batteries are located in an attachment, usually called a flashgun. In the former arrangement the main body of the camera is also provided with a reflector and a suitable socket or receptacle to receive a flashlamp whereas in the latter the reflector and the lamp socket or receptacle are all part of the flashgun.

With the miniaturization of cameras and flashlamps, both the foregoing arrangements for providing an auxiliary light source for photography left more and more to be desired. In the case of flashguns, this "attachment" was entirely too large relatively speaking with respect to the miniaturized camera with which it was associated. In the case of cameras having a lamp socket or receptacle and a reflector built in, the miniaturized lamps became more and more difficult and awkward to handle, malfunctions increased and the builtin reflector took up too much space in the miniaturized camera.

The introduction of the multilamp photographic flashlamp unit, generally known as a flashcube, represented a significant advance in the art. It eliminated the need for flashguns and it eliminated the need for builtin reflectors. It also eliminated the handling of the flashlamps individually. However, it did not eliminate the need for batteries.

One of the most chronic problems and perhaps most exasperating circumstance with which the average amateur photographer is confronted is weak batteries—batteries too weak to fire the lamp. The average amateur photographer will usually have a spare flashlamp or two but rarely if ever will he have a pair of spare fresh batteries. Thus a single shot, or more probably a whole sequence, will be lost. Dry cell batteries, by their very nature, tend to lose their strength gradually over an extended period of time. Many amateur photographers take flash pictures less than half a dozen times a year, thus providing more than enough time between uses for the batteries to deteriorate from strong to weak—from operativeness to inoperativeness.

In the copending application of D. N. Brooks et al., filed Feb. 7, 1968, entitled "Photoflash Lamp Unit," assigned to the same assignee as this application, there is disclosed a multilamp photographic flashlamp unit of the flashcube type employing flashlamps of the percussive type which require no batteries for firing.

The principal object of this invention is to provide a camera with means for firing flashlamps of the percussive type.

Another object is to adapt a camera to receive a multilamp photographic flashlamp unit having lamps of the percussive type.

A further object is to provide a camera with a torsion-type device for firing percussive-type flashlamps in a multilamp photographic flashlamp unit.

These and other objects, advantages and features are attained, in accordance with the principles of this invention, by providing a camera with means for receiving a flashcube having lamps of the percussive type and by further providing the camera with a torsion-type device for firing them. More particularly, in the specific embodiment of the invention illustrated and described herein, a camera is provided with an indexable socket to receive and rotate a flashcube having percussive-type flashlamps and a torsion device associated therewith in the form of a wire torsion spring having a striker formed on one end thereof and a cocking lever formed on the other end thereof. Means are provided to synchronize the release of the wire torsion spring with the tripping of the camera shutter.

In the accompanying drawings illustrating a specific embodiment of this invention, FIG. 1 is a top plan view of a camera with the cover removed showing principally the film winding and shutter cocking mechanism and the flashcube indexing mechanism.

FIG. 2 is a front elevational view of the camera of FIG. 1, with the cover and front face plate removed, showing principally the shutter release mechanism, the torsion spring striker latch mechanism, the mechanism for locking out the flashcube indexing mechanism and the cocking latch tripping mechanism, all being shown in the position they assume when the camera has been cocked and is ready for firing.

FIG. 5 is a front elevational view of the camera of FIG. 1, with the cover and front face plate removed, showing the same mechanisms as those shown in FIG. 2, in the position which they assume when the shutter has been tripped and the lamp fired.

Figure 1:
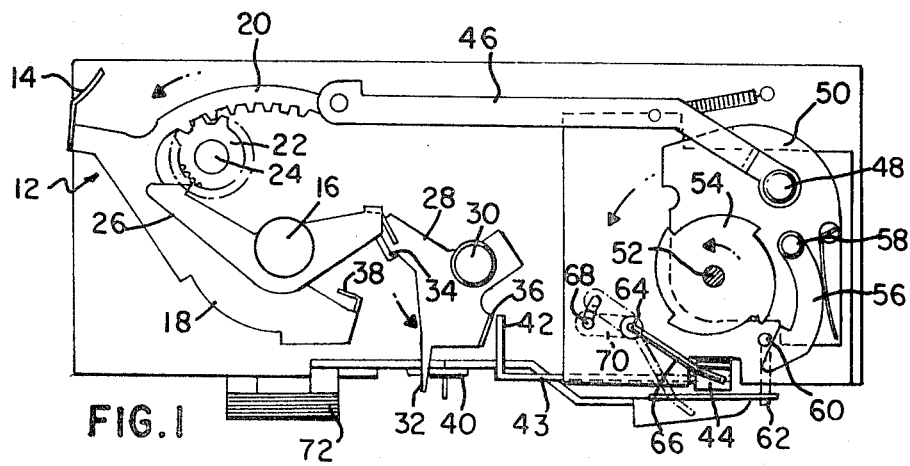

As noted above, FIG. 1 is a plan view of a camera with the cover thereof removed to expose two principal mechanisms mounted on the top face of the camera body, a film winding and shutter cocking mechanism and a mechanism for rotating a flashcube, the latter mechanism being connected to the former. The mechanisms as shown in FIG. 1 have been cocked and are ready for picture-taking.

The principal component of the film winding and shutter cocking mechanism is a bifurcated film advancing lever 12 having a handle 14 and being pivotally mounted at 16 on one leg 18 thereof. The other leg comprises a rack 20 which meshes with a pinion 22 mounted on a film takeup reel 24. A pawl 26 is also pivotally mounted at 16 and engages another set of teeth in pinion 22 to permit motion of the reel 24 in only one direction.

The principal component of the shutter cocking mechanism is a spring-loaded shutter striking plate 28 pivotally mounted at 30. The plate 28 is characterized by a projecting finger 32 and a pair of upstanding tabs 34 and 36. The tab 34 is disposed in cooperative relationship with respect to a tab 38 depending from the leg 18 of the film advancing lever 12 to provide the means whereby the shutter striking plate 28 is cocked. The shutter striking plate 28 is held cocked by a detent 40 disposed in interlocking relationship with respect to the projecting finger 32. The tab 36 is disposed in cooperative relationship with respect to a tab 42 which defines one end of a striker latch arm 43. The other end of the arm 43 is pivotally connected at 45 to striker latch 44 intermediate its ends.

The mechanism for rotating a flashcube is connected to the film winding and shutter cocking mechanism by a link 46. One end of the link 46 is connected to the free end of the rack 20 and the other end thereof is pivotally mounted at 48 on a cocking plate 50. The cocking plate 50 is rotatably supported on a shaft 52 immediately beneath a ratchet 54 which is secured to the shaft 52. A spring-loaded pawl 56, pivotally mounted on cocking plate 50 at 58, normally meshes with ratchet 54 but, when the camera is cocked and ready for picture-taking as shown in FIG. 1, it is at this period of time locked out by a pin 60 disposed therebetween. The pin 60 is supported for reciprocation within the main body of the camera and has a laterally extending stud 62 projecting therefrom.

That portion of the lamp firing mechanism shown in FIG. 1 comprises a torsion spring 64, a striker 66, a cocking pin 68 and a cocking pin arm 70. In the cocked position as shown in FIG. 1, the striker 66 is held by the striker latch 44.

The mechanism shown in FIG. 2, like those in FIG. 1, are shown in the cocked position. Picture-taking is effected by operation of a shutter release plate 72 which comprises the exposed portion of the shutter release mechanism. The shutter release plate 72 is an integral part of a shutter release arm 74 pivotally mounted at 76 on the camera body. As noted above in the description of FIG. 1, the shutter release arm 74 is provided with a detent 40 which restrains the finger 32 and thus the springsloaded shutter striking plate 28 in the cocked position. A shutter 78 is pivotally mounted at 80 on the camera body and has an upstanding ear 82 which normally lies in the path of the finger 32 when it is released. Thus the shutter 78 is tripped by the finger 32 upon its release by the displacement of the detent 40.

As mentioned above in the description of FIG. 1, the striker 66 is restrained by the striker latch 44. As shown in FIG. 2, the striker latch 44 is pivotally mounted at 84 on the camera body and is spring-loaded in the upright position by spring 86.

The shutter release arm 74, as noted above, is pivotally mounted at one end thereof at 76. Normally, insofar as the function of releasing the shutter is concerned, the other end of the shutter release arm would be free and terminate just beyond the shutter. However, as shown in FIG. 2, other mechanisms are secured thereto. A pin-tripping finger 88 is secured to the shutter release arm 74 at 90. This finger 88 overlies stud 62 on pin 60 (see also FIG. 1). One end of a latch-tripping spring 92 is secured to the shutter release arm 74 at 90 and the free end thereof is shaped to define a hook 93 to engage and trip a latch. Intermediate its ends the spring 92 is provided with a serration 94 which defines a camming face normally in engagement with a stud 96 projecting from the camera body. A plate 98 attached to the camera body is shaped to define an enclosure 100 through which the spring 92 extends.

Figure 3:
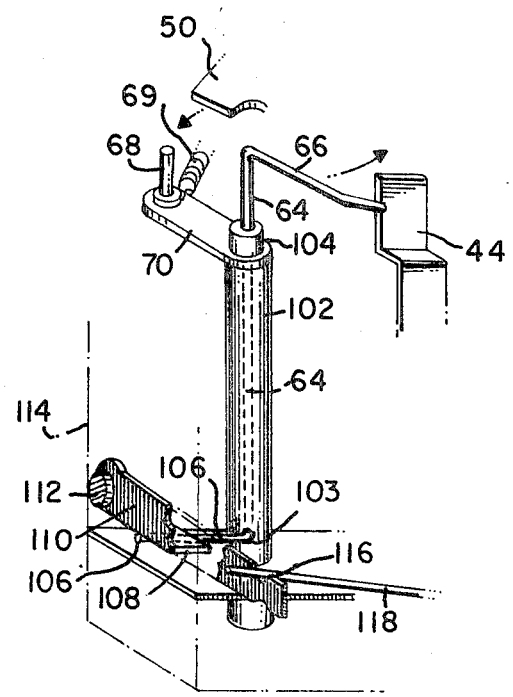
FIG. 3 is a fragmentary, perspective detail of the lamp firing mechanism and its associated parts shown in the uncocked position with the cocking latch overlying the cocking lever.
Figure 4:
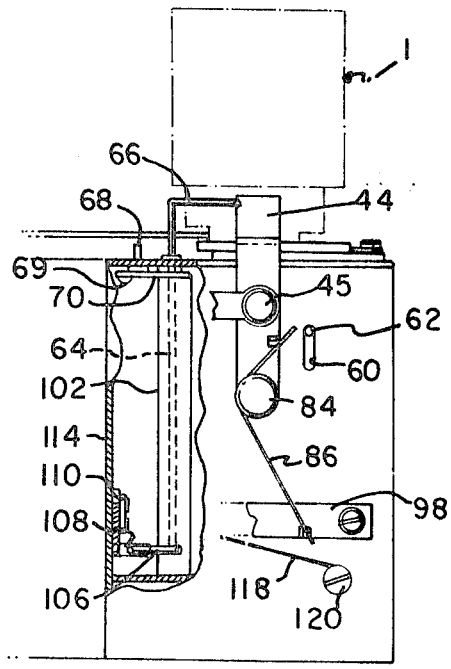
FIG. 4 is a front elevational view partly in section of the right front of the camera of FIGS. 1 and 2, showing particularly the lamp firing mechanism in the cocked position.

The lamp firing mechanism and associated parts are shown in detail in FIGS. 3 and 4. It was noted above in the description of FIG. 1 that the lamp firing mechanism includes a torsion spring 64, a striker 66, a cocking pin 68 and a cocking arm 70 and that the striker 66 is restrained by the striker latch 44. As shown in more detail in FIGS. 3 and 4, the lamp firing mechanism is shown in the uncocked position in FIG. 3 and the cocked position in FIG. 4. The torsion spring 64, which is the principal component of the lamp firing mechanism, is disposed within a torque tube 102. The cocking pin arm 70 is secured to the torque tube 102 just below bearing 104. The upper end of torsion spring 64 is bent at an angle of about 90° degrees to define the striker 66. The lower end of the torsion spring 64 is secured to the torque tube 102 and emerges therefrom at 103 where it is also bent at an angle of about 90° to define a cocking lever 106. As shown in FIG. 3 in its uncocked or fired position, the cocking lever 106 lies beneath the laterally extending portion or shelf 108 of a substantially L-shaped cocking latch 110 pivotally supported at one end thereof at 112 on a wall 114 in the camera body, whereas in its cocked position as shown in FIG. 4, the cocking lever 106 abuts the front lateral edge of the shelf 108 which defines a bearing surface therefor. The free end of the latch 110 is provided with a notch 116, cut in the upper longitudinal edge thereof, through which an overlying spring wire 118 extends. The wire 118 is anchored at 120 and normally urges the latch 110 which it engages downwardly.

A flashcube of the type with which the apparatus of this invention may be employed is shown and described in the copending application of D. N. Brooks et al., filed Feb. 7, 1968, entitled "Photoflash Lamp Unit" and assigned to the same assignee as this application. As shown and described in detail in that application and as illustrated in the accompanying drawings, a flashcube 1 includes four photoflash lamps 2, each having its own reflector 3, enclosed within a transparent container 5 and supported on a base 6. The base 6 fits in a camera socket 7 mounted on shaft 52. A primer tube 4, within which an anvil and a body of fulminating material are disposed, is sealed in and depends from each lamp 2. The primer tube 4 of a lamp in firing position lies in the path of the striker 66 of the torsion spring 64.

An operating cycle of the apparatus of this invention will now be described, starting with the several mechanisms thereof in the cocked position and ready for picture-taking as shown in FIGS. 1 and 2. A picture is taken when the operator depresses the shutter release plate 72. Depression of the shutter release plate 72 causes the shutter release arm 74 of which it is an integral part to rotate clockwise about its pivot 76 from the FIG. 2 to the FIG. 5 position and thus actuate several of the mechanisms associated therewith. During the early stages of this clockwise rotation of the shutter release arm 74, the detent 40 on the upper longitudinal edge thereof moves out of interlocking relationship with the projecting finger 32 of the spring-loaded shutter striking plate 28 (FIG. 1) and thus permits it to trip the shutter 78. As soon as this finger 32 and the plate 28 start to rotate counterclockwise as viewed in FIG. 1 the tab 36 on the plate 28 moves into engagement with the tab 42 and the striker latch arm 43 to the right (from the FIG. 2 to the FIG. 5 location), thus causing the striker latch 44 to rotate clockwise about its pivot 84 until it moves out of engagement with the striker 66. This permits the torsionally loaded spring 64 to drive the striker 66 into engagement with the primer tube 4 and thus fire the lamp in synchronization with the operation of the shutter.

As was noted above in the description of the shutter arm 74, it was pointed out that this arm 74 had a pin-tripping finger 88 and a latch-tripping spring 92 secured thereto. As the downward or clockwise movement of the shutter release arm 74 continues, the finger 88 engages and displaces the stud 62 and thus the spring-loaded lockout pin 60 from which it extends. This downward displacement of the pin 60 from the FIG. 2 to FIG. 5 position causes the upper end of this pin to move out of interlocking engagement with the spring-loaded pawl 56 (FIG. 1) and thus permits the pawl to swing over into mesh with the ratchet 54.

The downward or clockwise movement of the shutter release arm 74 also effects a displacement of the latch-tripping spring 92 depending therefrom. As the spring 92 moves downwardly from the FIG. 2 to the FIG. 5 position, the serration 94 thereof will move away from the camming stud 96 and thus permit the spring 92 to rotate clockwise as it is moving downwardly. Thus when the spring reaches the end of its downward stroke, the hook 93 at the free end thereof will be beneath and aligned with the free end of the cocking latch 110.

When the operator releases the shutter release plate 72 to permit the spring-loaded shutter release arm 74 to return from the FIG. 5 to the FIG. 2 position, the pin-tripping finger 88 and the latch-tripping spring 92 return with it since they are attached thereto.

Return of the pin-tripping finger 88 permits the lockout pin 60 to return, but only partway because at this point in time the spring-loaded pawl 56 (FIG. 1) overlies it and will not be displaced to permit the spring-loaded lockout pin 60 to return fully to the "up" position until the film advancing lever is operated to advance the film and cock the shutter for the next picture.

Return of the latch-tripping spring 92 trips the cocking latch 110 to thereby provide for the return of the striker 66 of the torsion spring 64. As was noted above in the description thereof, the lamp firing mechanism is shown in the uncocked position in FIG. 3 and the cocked position in FIG. 4. As was also noted above, the lamp is fired when the striker 66 drives against the primer tube 4. At this point in time the cocking lever 106 still abuts the front lateral edge of the shelf 108 of the cocking latch 110. In this position it prevents clockwise rotation of the torsion spring assembly to a position of rest out of the path through which the striker latch 44 must travel to return to its cocked position. Thus, as the spring 92 returns from the FIG. 5 to the FIG. 2 position, the hook 93 on the free end thereof will trip the cocking latch 110 upwardly a distance sufficient to free the cocking lever 106 and thus permit the loaded cocking pin spring 69 to rotate the entire torsion spring assembly clockwise, thus clearing the path through which the striker latch 44 can travel when it is otherwise released and free to do so. During this clockwise rotation of the torsion spring assembly the cocking lever 106 moves clockwise beneath the cocking latch 110. As the spring 92 continues its return stroke from the FIG. 5 to the FIG. 2 position, the stud 96 which lies in the path of the serration 94 will cam the spring 92 counterclockwise and thus move the hook 93 on the free end thereof out of engagement with the cocking latch 110. Since the cocking latch 110 is spring-loaded downwardly by the spring 118 which overlies it, it will be urged downwardly again immediately after the tripping action takes place but the cocking lever 106 will still be beneath it.

With the shutter release arm 74 bent back to its normal rest position, the camera is now ready to have the film wound to advance it to the next exposure, the flashcube rotated to advance a fresh flashlamp to the firing position and the several mechanisms associated therewith cocked for shooting the picture and firing the lamp. This is accomplished by counterclockwise rotation of the handle 14 of the bifurcated film advancing lever 12 as viewed in FIG. 1. As was the case prior to the development of this invention, advancement of the handle 14 winds the film and cocks the shutter. The film is wound by the rack 20 through the pinion 22 and the film takeup reel 24. In the uncocked or rest position the shutter striking plate 28 is located somewhat counterclockwise from the FIG. 1 cocked position and the tab 34 upstanding thereon is in engagement with the tab 38 depending from the leg 18 of the film advancing lever 12. Thus when the lever 12 is rotated counterclockwise, the shutter striking plate 28 is rotated clockwise to the cocked position as shown in FIG. 1 by the tab 38 working against the tab 34.

Operation of the lever 12 by counterclockwise rotation of its handle 14 also sets the mechanisms of this invention. As was noted above in the description of the picture-taking operating cycle, the striker latch 44 was displaced from the FIG. 2 to the FIG. 5 position by the tab 36 on the shutter striking plate 28 working against the tab 42 on the striker latch arm 43. Thus clockwise rotation of the shutter striking plate 28 to the cocked position permits the spring-loaded striker latch 44 to return from the FIG. 5 to the FIG. 2 position.

Operation of the lever 12 by counterclockwise rotation of its handle 14 also rotates the flashcube 1 90° to advance the next flashlamp into firing position and cocks the torsion spring 64 because these mechanisms are connected thereto through the link 46 as seen in FIG. 1. Thus when the link 46 moves to the left as viewed in FIG. 1, it causes the cocking plate 50 to rotate counterclockwise about the shaft 52. Since the pawl 56 is mounted on the plate 50 and, at this point of time, is in mesh with the ratchet 54 secured to the shaft 52, the counterclockwise rotation of the plate 50 about the shaft 52 also causes the shaft 52 and the ratchet 54 secured thereto to rotate and thus rotate the flashcube 1 mounted on the shaft.

During the early portion of this counterclockwise movement of the cocking plate 50, pawl 56 and ratchet 54, the pawl 56 will have moved sufficiently from the FIG. 1 disposition thereof so that it will no longer overlie the spring-loaded lockout pin 60 and thus permit the pin to rise to its full elevation and, on the return stroke of the cocking plate 50, lock out the pawl 56 from further engagement with the ratchet 54 as shown in FIG. 1.

As the cocking plate 50 nears the end of its counterclockwise rotation, the forward edge thereof engages and displaces the cocking pin 68 and thus load the torsion spring 64. Counterclockwise rotation of the cocking pin 68 causes similar rotation of the cocking pin arm 70, the torque tube 102 to which it is secured and the torsion spring 64 which is secured to the tube 102 at 103. Since the latch 44 lies in the path of the striker 66, further rotation of the spring 64 after the striker 66 has engaged the latch 44 twists and thereby torsionally loads the spring. This twisting of the spring displaces the cocking lever 106 which comprises a lateral extension of the lower end thereof and thus moves the cocking lever 106 out from under the shelf portion 108 of the cocking latch 110 and it rides up onto the front lateral edge of the shelf 108 to thereby hold the spring under load after the cocking plate 50 moves out of engagement with the cocking pin 68 on its return stroke.

Although one or more additional strokes of the film advancing lever 12 may be required to advance the film to the next frame, it will not cause further rotation of the flashcube because the lockout pin 60 is now holding the pawl 56 out of engagement with the ratchet 54 and thus further counterclockwise rotation of the cocking plate 50 will not be transmitted to the ratchet 54 or the shaft 52 on which the ratchet and the flashcube are mounted. In addition, suitable means, such as a ball and detent mechanism associated with the shaft 52, are employed to hold the flashcube at the end of its rotational stroke to maintain the lamp which has been advanced in the proper firing position.

We claim:

1. In a camera having means for receiving a flash lamp unit which unit contains at least one photoflash lamp ignitable by striking an impact sensitive member located at a firing site, a firing device comprising:
   a spring mounted for torsional movement in said camera;
   striking means operatively associated with said spring and supported in said camera for movement into impact producing contact with an impact sensitive member at said firing site in response to torsional restoring movement of said spring.

2. The camera according to claim 1 wherein said striking means is integral with said spring.

3. In a camera, a device for igniting photoflash lamps fireable by striking an impact receiving member located at a firing site, said device comprising:
   means for receiving such a photoflash lamp,
   an elongated torsion spring having a longitudinal axis and first and second opposed ends transversely disposed with regard to said axis,
   means for supporting said spring for rotation on its longitudinal axis,
   a striking element associated with one end of said torsion spring and movable in a striking path towards said firing site in response to torsional restoring movement of said spring, and
   means for preventing rotation of said first end of said torsional spring in a first direction in a manner causing torsional restoring forces to accumulate in said spring upon rotation on said axis of the second end of said spring in a second direction opposite to said first direction.

4. The camera according to claim 3 wherein said striking element is integral with one end of said torsional spring.

5. In photographic apparatus having a firing site and means for supporting a percussion ignitable photoflash lamp at said firing site, a firing device comprising:
   a spring mounted for torsional movement;
   striking means operatively associated with said spring and supported for movement into percussive contact with the lamp at said firing site in response to torsional restoring movement of said spring;
   means for torsionally distorting said spring in a direction creating restoring forces in said spring urging said striking means towards said firing site;
   means for restraining said striking means at a position spaced from said firing site; and
   means for releasing said striking means after a predetermined torsional distortion of said spring permitting said striker to contact said lamp.

6. In photographic apparatus having a firing site and means detachably receiving and supporting a percussion-ignitable photoflash lamp at said firing site, a firing device comprising:
   a. an elongated wire spring including a body portion with a longitudinal axis, a striking portion extending a generally right angle from one end of said body portion and a drive portion extending at generally right angles from the other end of said body portion;
   b. means for supporting said body portion in said apparatus for rotation on its longitudinal axis and at a location such that said striking portion is movable into percussion contact with a lamp at said firing site;

c. means for restraining said striking portion at a location spaced from said firing site; and
d. means for moving said driving portion in a direction creating torsional forces in said body portion urging said striking portion towards said firing site.

7. The invention defined in claim 6 further comprising means for releasing said striking portion from said restraining means.

PO-1050
(5/69)

UNITED STATES PATENT OFFICE
CERTIFICATE OF CORRECTION

Patent No. 3,581,638           Dated June 1, 1971

Inventor(s) George W. Parsons; William T. Colville

It is certified that error appears in the above-identified patent and that said Letters Patent are hereby corrected as shown below:

Column 6, Claim 6, line 1:

Between the words "means" and "detachably" insert ---for---.

Signed and sealed this 14th day of December 1971.

(SEAL)
Attest:

EDWARD M. FLETCHER, JR.         ROBERT GOTTSCHALK
Attesting Officer               Acting Commissioner of Patents